(12) United States Patent
Nakhjiri

(10) Patent No.: US 8,099,597 B2
(45) Date of Patent: Jan. 17, 2012

(54) SERVICE AUTHORIZATION FOR DISTRIBUTED AUTHENTICATION AND AUTHORIZATION SERVERS

(75) Inventor: Madjid F. Nakhjiri, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 924 days.

(21) Appl. No.: 11/849,108

(22) Filed: Aug. 31, 2007
(Under 37 CFR 1.47)

(65) Prior Publication Data
US 2008/0168537 A1    Jul. 10, 2008

Related U.S. Application Data

(60) Provisional application No. 60/884,170, filed on Jan. 9, 2007.

(51) Int. Cl.
*H04L 9/00* (2006.01)
(52) U.S. Cl. ............... 713/169; 726/4; 380/270
(58) Field of Classification Search ............ 713/169
See application file for complete search history.

(56) References Cited

U.S. PATENT DOCUMENTS

| | | | |
|---|---|---|---|
| 6,879,690 B2 * | 4/2005 | Faccin et al. ............ | 380/247 |
| 7,069,433 B1 | 6/2006 | Henry et al. | |
| 7,171,555 B1 | 1/2007 | Salowey et al. | |
| 7,210,163 B2 * | 4/2007 | Stoll ..................... | 726/2 |
| 7,210,167 B2 | 4/2007 | Brezak et al. | |
| 2002/0174335 A1 * | 11/2002 | Zhang et al. ............ | 713/168 |
| 2003/0046541 A1 * | 3/2003 | Gerdes et al. ............ | 713/168 |
| 2003/0110375 A1 | 6/2003 | Colvin | |
| 2004/0088544 A1 * | 5/2004 | Tariq et al. ............ | 713/162 |
| 2004/0250119 A1 * | 12/2004 | Shelest et al. ............ | 713/201 |
| 2005/0177733 A1 | 8/2005 | Stadelmann et al. | |
| 2006/0185013 A1 | 8/2006 | Oyama et al. | |
| 2006/0236116 A1 | 10/2006 | Patel | |
| 2007/0209064 A1 | 9/2007 | Qin et al. | |
| 2007/0214498 A1 | 9/2007 | Pindra et al. | |
| 2007/0220598 A1 | 9/2007 | Salowey et al. | |
| 2007/0297611 A1 | 12/2007 | Yun et al. | |
| 2008/0060065 A1 * | 3/2008 | Wynn et al. ............ | 726/5 |

(Continued)

FOREIGN PATENT DOCUMENTS

CN          1329418 A     1/2002

(Continued)

OTHER PUBLICATIONS

Kim et al., "Improving Cross-domain Authentication over Wireless Local Area Networks", 2005, IEEE, pp. 1-12.*

(Continued)

*Primary Examiner* — Matthew Smithers
(74) *Attorney, Agent, or Firm* — Slater & Matsil, L.L.P.

(57) ABSTRACT

A communications component comprising a processor configured to implement a method comprising acquiring an authentication identifier (Auth ID), and constructing a network service identifier (NSI) comprising the Auth ID and an authentication, authorization, and accounting (AAA) realm. The disclosure includes a system comprising an authorization server in communication with a host, wherein the authorization server is configured to verify a previous authentication of the host using a NSI. Also disclosed is a method comprising receiving a NSI and a service request, wherein the NSI comprises an Auth ID, determining an authentication server associated with the Auth ID, verifying an authentication of a host using the Auth ID, and authorizing the host to receive a service associated with the service request.

20 Claims, 2 Drawing Sheets

U.S. PATENT DOCUMENTS

| | | | |
|---|---|---|---|
| 2008/0065883 | A1 | 3/2008 | Zeng et al. |
| 2008/0127317 | A1* | 5/2008 | Nakhjiri ............................ 726/6 |
| 2008/0141031 | A1 | 6/2008 | Oba et al. |
| 2008/0175393 | A1 | 7/2008 | Oba et al. |
| 2008/0178274 | A1* | 7/2008 | Nakhjiri et al. ................... 726/9 |

FOREIGN PATENT DOCUMENTS

| | | |
|---|---|---|
| CN | 1486029 A | 3/2004 |
| CN | 1564626 A | 1/2005 |
| CN | 1674491 A | 9/2005 |
| CN | 1831836 A | 9/2006 |
| CN | 1836419 A | 9/2006 |
| EP | 1 278 330 A1 | 1/2003 |
| EP | 1 657 943 A1 | 5/2006 |
| KR | 1020050050794 A | 6/2005 |
| WO | WO 01/72009 A2 | 9/2001 |
| WO | WO 2004/112348 A1 | 12/2004 |
| WO | WO 2004/112349 A1 | 12/2004 |
| WO | WO 2005/004433 A1 | 1/2005 |
| WO | WO 2005/109751 A1 | 11/2005 |
| WO | WO 2006/022469 A1 | 3/2006 |
| WO | WO 2006/107713 A1 | 10/2006 |
| WO | WO 2006/118342 A1 | 11/2006 |

OTHER PUBLICATIONS

Lee et al., "The Design of Dynamic Authorization Model for User centric service in Mobile Environment", Feb. 22, 2006, IEEE, pp. 2124-2127.*

Aboba, B. et al., "The Network Access Identifier," RFC 4282, The Internet Society, 15 pages, Dec. 2005.

Arkko, J. et al., "Extensible Authentication Protocol Method for $3^{rd}$ Generation Authentication And Key Agreement (EAP-AKA)," RFC 4187, The Internet Society, 74 pages, Jan. 2006.

Giaretta, G. et al., "Mobile IPv6 Bootstrapping in Split Scenario," The IETF Trust, 29 pages, Jul. 22, 2007.

Narayanan, V., et al., "EAP Extensions for EAP Re-authentication Protocol (ERP)," RFC 5296, Network Working Group, Aug. 2008, 44 pages.

Harkins, D., et al., "Problem Statement and Requirements on a 3-Party Key Distribution Protocol for Handover Keying," Internet-Draft, Network Working Group, Mar. 4, 2007, 17 pages.

Kohl, J. T., et al., "The Evolution of the *Kerberos* Authentication Service," presented at EurOpen Conference, Tromso, Norway, 1991, 15 pages.

Nakhjiri, M., et al., "A Network Service Identifier for separation of Mobile IPv6 service authorization from Mobile node authentication," Internet-Draft, Network Working Group, Jan. 18, 2007, 19 pages.

Nakhjiri, M., "Keying and signaling for wireless access and handover using EAP (EAP-HR)," Internet-Draft, Network Working Group, Apr. 5, 2007, 23 pages.

Neuman, B. C., et al, "Kerberos: An Authentication Service for Computer Networks," USC/ISI Technical Report No. ISI/RS-94-399, IEEE Communications Magazine, vol. 32, No. 9, Sep. 1994, 10 pages.

Aboba, B., et al., "Extensible Authentication Protocol (EAP) Key Management Framework," The IETF Trust, downloaded from http://tools.ietf.org/html/draft-ietf-eap-keying-18, 68 pages, Feb. 7, 2007.

Kaufman, C., "Internet Key Exchange (IKEv2) Protocol," The Internet Society, downloaded from http://tools.ietf.org/html/rfc4306, 98 pages, Dec. 2005.

Salowey, J., et al., "Specification For The Derivation of Usage Specific Root Keys (USRK) From An Extended Master Session Key (EMSK)", The Internet Society, downloaded from http://tools.ietf.org/html/draft-ietf-hokey-emsk-hierarchy-00, 16 pages, Jan. 11, 2007.

Sithirasenan, E., et al., "IEEE 802.11i WLAN Security Protocol—A Software Engineer's Model," IEEE, 2005, 12 pages.

Kivisteö, M., et al., "802.16e—Mobile WiMAX,"IEEE, 28 pages.

Zuleger, H., "Mobile Internet Protocol MIPv6 a brief introduction," Holger.Zuleger@hznet.de, Dec. 13, 2005, 15 pages.

Eronen, P., et al., "Diameter Extensible Authentication Protocol (EAP) Application," Network Working Group, Standards Track, RFC 4072, Aug. 2005, 33 pages.

Carter, G., "PPP EAP ISAKAMP Authentication Protocol," Nov. 19, 1997, retrieved from http://tools.ieft.org/html/draft-ieft-ppext-eapisakmp-00 on May 13, 2011, 22 pages.

Dukes, D. "Proposed Configuration Payload for IKEv2," Dec. 18, 2002, retrieved from http://www.vpnc.org/ietf-mode-cfg/mail-archive/msg00016.html on May 13, 2011, 17 pages.

Vollbrecht, J., et al., RFC4137, "State Machines for Extensible Authentication Protocol (EAP)," Aug. 2005, retrieved from http://www.http://tools.ietf.org/html/rfcs4137 on May 13, 2011, 52 pages.

Cheikhrouhou, O., et al., "Security Architecture in a Multi-Hop Mesh Network," Jun. 2006, 10 pages.

Arayanan, V., et al. "Problem Statement on EAP Efficient Re-Authentication and key Management," draft- vidya-eap-reauth-ps-00, Oct. 15, 2006, retrieved from http://tools.ietf.org/id/draft-vidya-eap-reauth-ps-00.txt on May 13, 2011, 13 pages.

Kafle, V.P., et al., "Extended Correspondent Registration Scheme for Reducing Handover Delay in Mobile IPv6," May 12, 2006, Proceedings of the 7th International Conference on Mobile Data Management (MD'06), IEEE, 5 pages.

Narayanan, V., et al. "EAP Extensions for Efficient Re Authentication," draft-vidya-eap-er-02, Jan. 19, 2007, retrieved from http://tools.ietf.org/html/draft-vidya-eap-er-02 on May 13, 2011, 27 pages.

Clancy, T., et al., RFC5169, Handover Key Management and Re-Authentication Problem Statement, retrieved from http://tools.ieft.org/search/rfc5169, May 13, 2011, 16 pages.

Dondeti, L., "EAP Efficient Re-Authentication," Mar. 2007, Retrieved from http://www.ietf.org/proceedings/68slides/hokey-2.pdf on Feb. 2, 2011.

Written Opinion of the International Searching Authority, International Application No. PCT/CN2008/070952, Applicant: Huawei Technologies Co., Ltd., et al., Dated: Aug. 28, 2008, 10 pages.

International Search Report, PCT/CN2007/070570, Date of mailing of the international search report Dec. 6, 2007, 2 pages.

English Translation of the Written Opinion of the International Searching Authority, PCT/CN2007/070570, Date of mailing Dec. 6, 2007, 4 pages.

Chinese Office Action, Application No. 200780042379.0, Dated Apr. 23, 2010, 10 pages.

* cited by examiner

SERVICE AUTHORIZATION FOR DISTRIBUTED AUTHENTICATION AND AUTHORIZATION SERVERS

CROSS-REFERENCE TO RELATED APPLICATIONS

The present application claims priority to U.S. Provisional Patent Application Ser. No. 60/884,170 filed Jan. 9, 2007 by Nakhjiri and entitled "Method for Service Authorization for Distributed Authentication and Authorization Server," which is incorporated by reference herein as if reproduced in its entirety. In addition, the present application is related to U.S. Non-Provisional application Ser. No. 11/838,377 filed Aug. 14, 2007 by Nakhjiri and entitled "System for Using an Authorization Token to Separate Authentication and Authorization Services," which is incorporated by reference herein as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication networks allow users to communicate with other users and/or networks using various devices. Frequently, a wireless device is used to receive various services from a service provider. For example, a user may use a wireless device to access email, music downloads, text messages, and so forth. Wireless devices are mobile in that the user may move from one access point to another or perhaps from one access network to another. The movement of the wireless device between the access points and/or networks increases the complexity of the communications between the wireless device and the service provider.

One of the issues raised by wireless communications is security. Specifically, wireless networks create an opportunity for unscrupulous users to eavesdrop on wireless communications and possibly impersonate a wireless device. Thus, various solutions have been created to verify the identity of wireless devices, a process called authentication. In addition, various solutions have been created to verify that the wireless device has the right to access the requested services, a process called authorization.

SUMMARY

In one aspect, the disclosure includes a communications component comprising a processor configured to implement a method comprising acquiring an authentication identifier (Auth ID), and constructing a network service identifier (NSI) comprising the Auth ID and an authentication, authorization, and accounting (AAA) realm.

In another aspect, the disclosure includes a system comprising an authorization server in communication with a host, wherein the authorization server is configured to verify a previous authentication of the host using a NSI.

In a third aspect, the disclosure includes a method comprising receiving a NSI and a service request, wherein the NSI comprises an Auth ID, determining an authentication server associated with the Auth ID, verifying an authentication of a host using the Auth ID, and authorizing the host to receive a service associated with the service request.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Described herein is a method and system for verifying the previous authentication of a host, such as a mobile node. Subsequent to the authorization of the host, one of the system components may generate a network service indicator NSI) comprising an Authentication Identifier (Auth ID) and authentication server realm information. When the host requests a service, the NSI is sent to the authorization server along with the service request. Upon receiving the NSI, the authorization server may use the authentication server realm information to locate the authentication server, and verify the host's previous authentication using the Auth ID. The NSI allows the authorization server to verify the host's previous authentication without having to repeat the authentication procedure. In addition, the NSI may allow the authentication and authorization functions to be separated from each other so that one or both of the authentication and authorization function may be outsourced.

Figure 1:
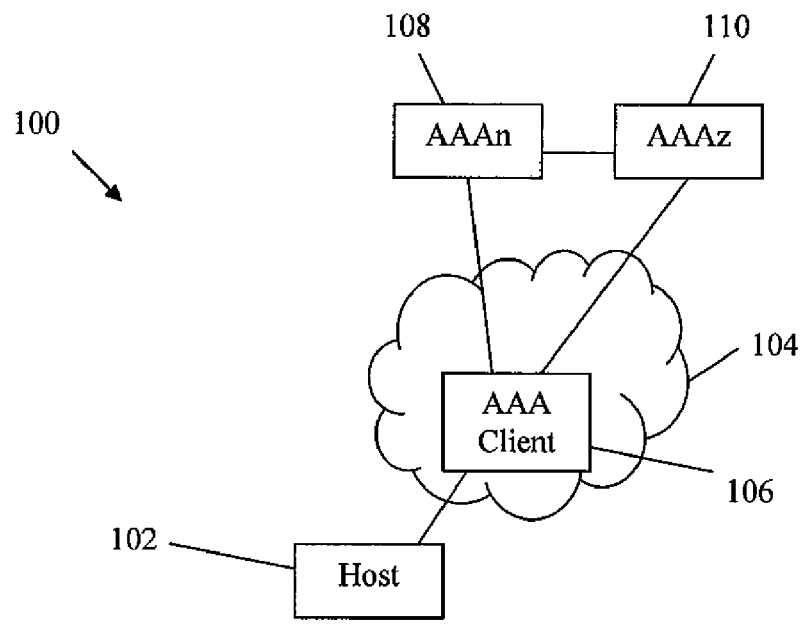
FIG. 1 is a schematic illustration of an embodiment of a communications network.

FIG. 1 displays an embodiment of a communications system 100 comprising a host 102, a network 104, an authentication, authorization, and accounting (AAA) client 106, an authentication server (AAAn) 108, and an authorization server (AAAz) 110. The network 104 allows the host 102 to access various services from a service provider in communication with the network 104. However, before the host 102 can access such services, the host 102 may need to be authenticated and/or authorized by the AAAn 108 and/or the AAAz 110.

The host 102 may be any device that access or communicates, directly or indirectly, with the network 104, the AAAn 108, and/or the AAAz 110. Specifically, the host 102 may be a wireless device, such as a mobile node (MN), that may communicate with a plurality of wireless networks. Examples of suitable hosts 102 include personal digital assistants (PDAs), portable computers, such as laptop, notebook, and tablet computers, cellular telephones, and other mobile communication or computing systems. Other examples of suitable hosts 102 include other types of computers, such as desktop, workstation, and kiosk computers using a wireless network connection. Alternatively, the host 102 may be any other type of computer or communication device known to persons of ordinary skill in the art.

The network 104 may be any type of network suitable for communicating with the host 102. Specifically, the network 104 allows the host 102 to communicate with other users, networks, and devices, such as the AAAn 108 and the AAAz 110. The network 104 may include, but should not be limited to, networks that issue addresses, such as Internet Protocol (IP) addresses, to the host 102. Such addresses may include permanent or fixed addresses as well as proxy or care-of addresses. The network 104 may include an AAA client 106, which may be an entity that passes messages between the host 102 and the AAAn 108 or AAAz 110. Specifically, the AAA client 106 may act as an agent or proxy for the host 102 in communications with the AAAn 108 and/or AAAz 110.

The network 104 may include infrastructure to carry out communications with a plurality of devices and networks, such as wireless access points (WAPs), base transceiver stations (BTSs), base station controllers (BSCs), mobile access gateways (MAGs), local mobility agents (LMAs), routers, switches, bridges, and/or routing logic circuitry. Specific examples of suitable networks 104 may include one or more of the following networks: the worldwide interoperability for microwave access (WiMAX), Wireless Fidelity (Wi-Fi), code division multiple access (CDMA), wideband CDMA (WCDMA), orthogonal frequency division multiple access (OFDMA), time division multiple access (TDMA), global system for mobile communications (GSM), enhanced data for GSM evolution (EDGE), universal mobile telecommunications system (UMTS), advanced mobile phone service (AMPS), one of the Institute for Electrical and Electronic Engineers (IEEE) 802 wireless networks, or any other wireless network. In other embodiments, one or both of the network 104 may be a public switched telephone network (PSTN), a packet switched network (PSN), an intranet, the internet, a local area network (LAN), or any other network known to persons of ordinary skill in the art.

The AAAn 108 and AAAz 110 are servers that may implement one or more authentication, authorization, or accounting functions. Authentication may refer to the verification of the identity of a user, network, or device, whereas authorization may refer to the verification that the user, network, or device is entitled to the requested service and/or access. Accounting may refer to the measurement, communication, and/or billing of the service and/or access used by the user, network, or device. For example, when a MN tries to access services from a service provider, the service provider may need to authenticate the MN's identity and verify that the MN has the authority to access the desired service. When the MN is authenticated and authorized, the access is granted and the MN's usage is accounted. As part of the present disclosure, the authentication function may occur in the AAAn 108 and the authorization function may occur in the AAAz 110.

While in one embodiment the functionality of the AAAn 108 and AAAz 110 may be consolidated, in another embodiment, the authentication function is separated from the authorization function. In such an embodiment, the AAAn 108 and AAAz 110 may be part of the same server, or may be part of separate servers, perhaps in separate networks. Separating the authentication function from the authorization function may allow one or both of the authentication and authorization functions to be outsourced to another network, system, or entierprise. Separating the authentication function from the authorization function may also allow different protocols to be used for the two functions. For example, the authentication function may use Extensible Authentication Protocol (EAP), while the authorization function uses Mobile IP (MIP). Thus, separating the authentication function from the authorization function may allow a mobility provider to deploy a MIP-capable AAAz server, while relying on another operator to provide an EAP-capable AAAn server for network access and authentication.

Figure 2:
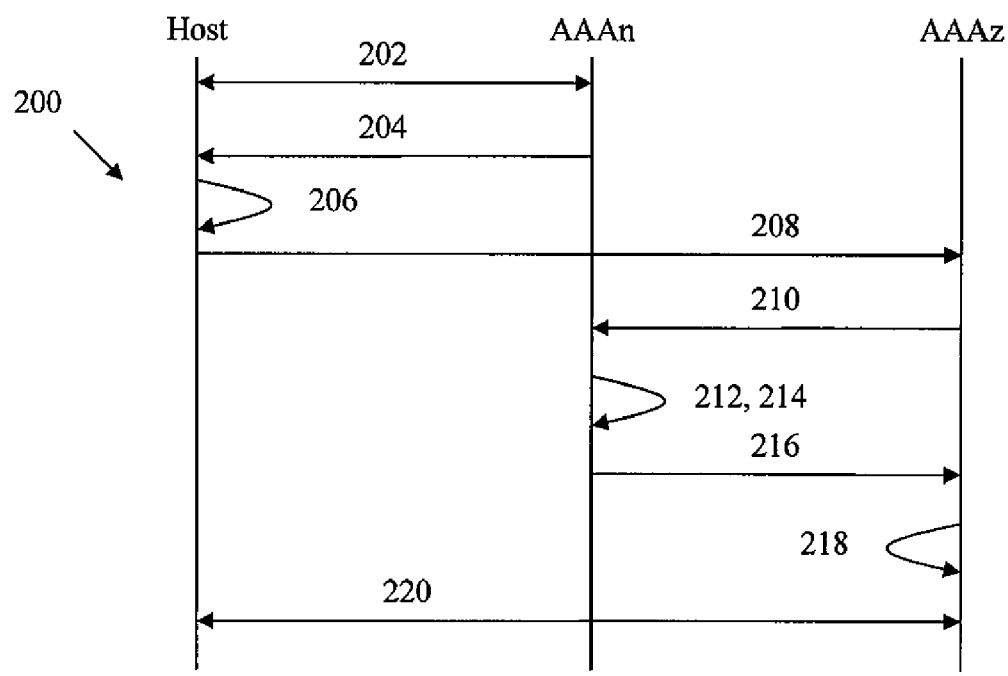
FIG. 2 is a diagram illustrating an embodiment of the protocol within the network.

FIG. 2 is a protocol diagram 200 illustrating one embodiment of the signaling between the host, the AAAn, and the AAAz. Specifically, the protocol diagram 200 illustrates the authentication of the host by the AAAn at 202, the creation of the Auth ID at 204, and the creation of the NSI at 206. In addition, the protocol diagram 200 illustrates the transmission of the service request and NSI to the AAAz at 208, the transmission of the service request and usage data to the AAAn at 210, and the verification of the host's authentication at 212. Finally, the protocol diagram 200 illustrates the verification of the host's signature and creation of various keys at 214, the transmission of a confirmation message to the AAAz at 216, the authorization of service by the AAAz at 218, and providing the services at 220. Although not illustrated in FIG. 2, it is contemplated that one or more of the communication signals between the host, the AAAn, and/or the AAAz may be routed through the AAA client.

Authentication of the host by the AAAn is shown at 202. Various authentication methods between a host and an AAA server exist, any one of which is suitable for use herein. Following successful authentication, the host and the AAAn may be able to generate master session keys, such as an EAP extended master session key (EMSK), from which service usage specific root keys (USRK) can be derived. The USRK can be used to generate special signing keys (SK), as discussed below. If the AAAn and AAAz are separate or use separate caches, then the AAAn may be aware of the SK without the AAAz knowing of the SK. One method for creation and use of the SK is disclosed in U.S. patent application Ser. No. 11/838,377 filed Aug. 14, 2007 by Nakhjiri and entitled "System for Using an Authorization Token to Separate Authentication and Authorization Services."

The creation of the Auth ID is shown at 204. The Auth ID may include state information regarding the host's interaction with the AAAn, and may allow an AAA server to find a previous authentication state for the host. In some embodiments, the Auth ID allows the AAA server to find the host's previous authentication while storing only a minimal amount of host-related information. In cases where increased security is desired, the Auth ID may be configured such that it is usable or valid for only one use.

There are several methods for creating the Auth ID. In one embodiment, the Auth ID may be a random number generated by the AAAn. The Auth ID may be temporally unique and unique for each host. In addition, the length of the Auth ID should be sufficiently long so as to provide uniqueness and protection against theft of service. For example, an Auth ID that generates a NSI at least about 253 octets long may be sufficient. To provide protection against replay attacks, each Auth ID should be used only once with each service request and each AAAz. Unless anti-replay measures are taken, such an embodiment may require the AAAn and/or the AAAz to cache all previously issued Auth IDs for all active authentication sessions, e.g. EAP sessions. Once the authentication session expires, the AAAn can delete the cache of Auth IDs issued to the hosts. In addition, the present embodiment of the Auth ID may need to be securely delivered to the host to protect the integrity of the Auth ID. For example, the Auth ID may be transported over a secure Diameter link from the AAAn to the AAA client, and then through secure Internet Key Exchange (IKE)v2 messaging from the AAA client to the host. This embodiment of the Auth ID may be preferred when the AAAz and AAAn are separate entities.

In another embodiment, the Auth ID may be a cryptographic stateless Auth ID. The cryptographic stateless Auth ID does not require any host-specific state, and instead uses generic states, such as internal non-host-specific keys and nonces. Specifically, the cryptographic stateless Auth ID may be pseudo-randomly generated using a key known to the AAAn and a nonce:

Auth ID=PRF(AAA key, "Auth ID generation"|nonce|length)

where PRF is a pseudo-random function, the | indicates concatenation, the AAA key is a internal key known to the AAAn, perhaps independent of the EAP session, that eliminates the need for encryption of the Auth ID during transport, the nonce is a temporal-specific indicator used to protect against anti-replay attacks, and the length is the length of the Auth ID and/or nonce, which may be at least 128 bits. The nonces may be refreshed at the discretion of the AAAn to the extent that the AAAn server memory allows for storage of previous nonces. Generally, the AAAn does not need to keep track of the state of all previously created Auth IDs, but needs to keep a cache of previously used nonces. However, if the AAA server sends the nonce along with the Auth ID to the host and the host includes the nonce in its future requests, the AAAn does not need to keep track of the state of the nonce. As with the previous embodiment, the Auth ID and/or the nonce may need to be securely delivered to the host or AAA client. The cryptographic stateless Auth ID is useful in cases where the AAAn does not keep any host-specific states and/or does not store all previously generated Auth IDs.

In a third embodiment, the Auth ID may be generated based on a key derived as part of a previous authentication. For example, the Auth ID may be created from the USRK. Such an embodiment may require the use of authentication protocols, such as EAP, that are capable of creating session keys, such as the EMSK. In cases where both the AAA client and the AAAn are capable of creating session keys, the Auth ID may be generated locally at the AAA client, thus eliminating the need for delivery from the AAAn. In such an embodiment, a USRK may be created from the EMSK, and then the Auth ID may be cryptographically created from the USRK. Such an embodiment may yield an Auth ID with one of the following compositions:

Auth ID=PRF (JSRK, "Auth ID generation"|nonce|other fields), or
    Auth ID=PRF (MIP6_USRK, "Auth ID generation"|<nonce>|service type|length)

Where < > denotes an optional field, service type is a number to be assigned by the Internet Assigned Numbers Authority (IANA) to Mobile IPv6 as a usage specific case, service type is used for services other than Mobile IP, and the length is the length of the Auth ID and/or nonce, which may be at least 128 bits. In some embodiments, the AAAn may be incapable of generating the USRK from the EMSK as such may require use of service specific data, called "usage data," which may not be available to the AAAn. In such a case, when the service request and NSI are forwarded to the AAAn for verification, the usage data may be conveyed to the AAAn. One advantage of this embodiment is that the host is able to generate the Auth ID, and thus a secure transport of the Auth ID from the AAAn to the host is not required. This embodiment may be preferred when the AAAn and the AAAz are the same and the AAAn is aware of the service being authorized at the time of host authentication.

The creation of the NSI is shown at 206. The NSI may be used by the AAAz to verify the host's pervious authentication, and generally comprises the Auth ID and an AAA realm. The realm information is generally an IP domain, e.g. of the form "myoperator.com," and may be used to assist the AAA infrastructure in routing AAA requests and/or as a reference within the various AAA servers. Specifically, the realm information may be used to associate the host or AAA client with an AAA domain and to help the AAA infrastructure route host or AAA client requests to the proper AAA servers. The realm information may follow the syntax of and be built in the same manner as in the network access identifier (NAI) defined in Internet Engineering Task Force (IETF) request for Consideration (RFC) 4282 by Aboba et al. entitled "The Network Access Identifier," which is incorporated herein by reference. In some embodiments, the AAA client or host creates, acquires, or receives the Auth ID and/or realm information, and creates the NSI. In other embodiments, the complete NSI may be given to the AAA client or host through the existing infrastructure, either from the AAAn or from an AAA agent, e.g. the MIP home agent.

The NSI may have various forms depending on the information known by the component assembling the NSI. When either the AAAn or AAAz domain is known, the NSI may have the following composition:

NSI=Auth Info @ AAA realm where the Auth Info is the Auth ID and the AAA realm is the AAAn realm or AAAz realm. In Mobile IPv6, the AAA client is aware of the realm for the AAAz, and thus the host may not need be aware of the realm for the AAAz. When both the AAAz realm and the AAAn realm are known, the other AAA realm may be included in the Auth Info:

Auth Info=Auth ID|<AAA Realm> where the existence of the other AAA realm may be indicated through an Auth Info realm flag is set when AAA realm is present or through a combination of Auth ID length and Auth Info length within the NSI. In such an embodiment, the NSI may have one of the following compositions:

NSI=Auth ID|<AAAn realm>@AAAz realm, or
    NSI=Auth ID|<AAAz realm>@AAAn realm

Such embodiments allow the AAA infrastructure to use the AAAz realm to route the service request and NSI to the AAAz. The AAAz may then parse the NSI, find the AAAn realm, and forward the service request to the AAAn.

The transmission of the service request and NSI to the AAAz is shown at 208. When the host or AAA client has the NSI and is ready to transmit the service request, the host or AAA client may create an extension to carry to NSI within the service request message, and send the service request message with the NSI to the AAAz. In the case of Mobile IPv6, the host or AAA client can attach the NSI in a host-MIP6 Authorization option within the Binding Update. In such a case, the host has access to the usage data, and thus may generate a root key for Mobile IPv6 service (MIP6_USRK) using the EMSK from the EAP. The host may also generate a Service Token Key from the MIP6_USRK to sign its request for Mobile IPv6 service. The AAA client may also use the SK to sign the information within the extension. It should be noted that SK is created from previous authentication key material, so a signature by SK is also a proof of previous authentication. However, the SK may not be needed when the messaging is otherwise protected. After receiving the signed NSI, the AAA agent adds the signed NSI to an AAA attribute, and sends the AAA attribute to the AAAz using its internal configuration or the AAAz realm information included in the NSI, if available.

The transmission of the service request and usage data to the AAAn is shown at 210. When the AAAz receives the NSI and usage data, the AAAz may use the AAAn realm information within NSI to forward the request to the AAAn. Alternatively, the AAAz has to determine the location of the AAAn. Thus, the inclusion of the AAAn realm information in the NSI may be advantageous because it eliminates the need for the AAAz to have to lookup the AAAn realm information. In addition to the NSI, the AAAz may also forward the usage data required for creation of USRK from the authentication keys, e.g. EMSK, to the AAAn.

The remaining portions of the method are shown at 212, 214, 216, 218, and 220. First, the AAAn verifies the host's authentication at 212. Specifically, the AAAn uses the Auth ID and the NSI to search for the host's authentication state, including the EMSK. When the host's authentication state is found, the AAAn may verify the host's authentication. The AAAn then verifies the host's signature and creates any necessary keys at 214. Specifically, after verifying the Auth ID, the AAAn may verify the host's signature provided in the NSI and create the Service Token Key and the USRK using the EMSK and the usage data from the AAAz. The AAAn may then transmit a confirmation message to the AAAz at 216. The confirmation message may include the USRK, if desired. The AAAz may then authorize the AAA client for service at 218, and the services are provided to the AAA client at 220.

Figure 3:
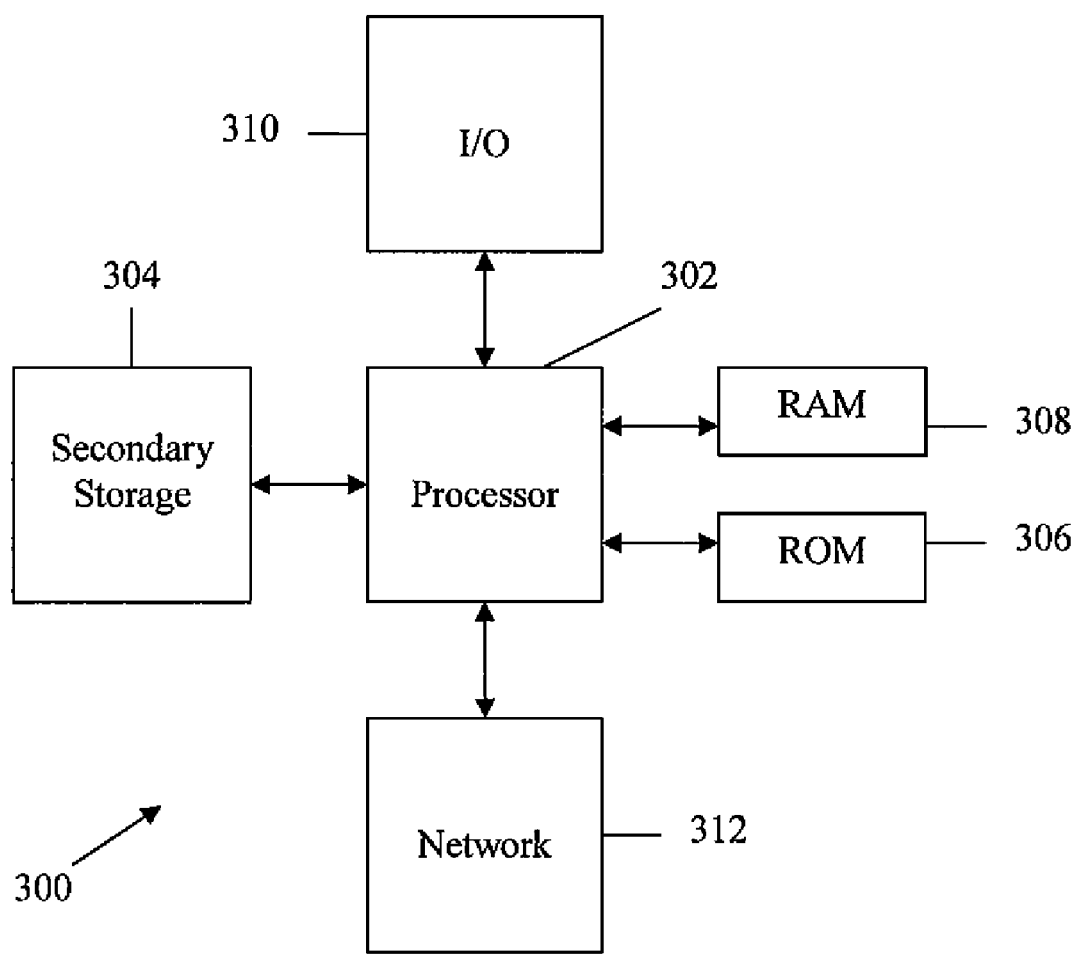
FIG. 3 is a schematic illustration of an exemplary general-purpose computer system.

The networks described above may be implemented on any general-purpose network component, such as a computer, node, or server with sufficient processing power, memory resources, and network throughput capability to handle the necessary workload placed upon it. FIG. 3 illustrates a typical, general-purpose network component suitable for implementing one or more embodiments of a node disclosed herein. The network component 300 includes a processor 302 (which may be referred to as a central processor unit or CPU) that is in communication with memory devices including secondary storage 304, read only memory (ROM) 306, random access memory (RAM) 308, input/output (I/O) 310 devices, and network connectivity devices 312. The processor may be implemented as one or more CPU chips, or may be part of one or more application specific integrated circuits (ASICs).

The secondary storage 304 is typically comprised of one or more disk drives or tape drives and is used for non-volatile storage of data and as an over-flow data storage device if RAM 308 is not large enough to hold all working data. Secondary storage 304 may be used to store programs that are loaded into RAM 308 when such programs are selected for execution. The ROM 306 is used to store instructions and perhaps data that are read during program execution. ROM 306 is a non-volatile memory device that typically has a small memory capacity relative to the larger memory capacity of secondary storage. The RAM 308 is used to store volatile data and perhaps to store instructions. Access to both ROM 306 and RAM 308 is typically faster than to secondary storage 304.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A communications component comprising:
   a processor configured to implement a method comprising:
   acquiring an authentication identifier (Auth ID); and
   constructing a network service identifier (NSI) comprising the Auth ID and an authentication, authorization, and accounting (AAA) realm.

2. The component of claim 1, wherein the AAA realm comprises an authentication server realm.

3. The component of claim 1, wherein the AAA realm comprises an authorization server realm.

4. The component of claim 1, wherein the AAA realm comprises an authentication server realm and an authorization server realm.

5. The component of claim 1, wherein the Auth ID is a random number.

6. The component of claim 1, wherein the Auth ID is a cryptographic stateless Auth ID.

7. The component of claim 6, wherein the NSI further comprises a nonce.

8. The component of claim 1, wherein the Auth ID is issued to a host and is created using a key from a previous authentication of the host.

9. The component of claim 8, wherein the NSI further comprises a nonce.

10. The component of claim 1, wherein the processor is part of an authentication server.

11. The component of claim 1, wherein the processor is part of an AAA client.

12. The component of claim 1, wherein the processor is part of a host.

13. A system comprising:
    an authorization server in communication with a host, wherein the authorization server is configured to verify a previous authentication of the host using a network service identifier (NSI).

14. The system of claim 13, wherein the authorization server communicates with the host via an authentication, authorization, and accounting (AAA) client.

15. The system of claim 13, wherein the NSI comprises an authorization identifier (Auth ID) generated by the host or an authentication server responsible for the previous authentication.

16. The system of claim 15, wherein the authentication server and the authorization server are separate entities.

17. The system of claim 15, wherein the Auth ID is a random number, a cryptographic stateless Auth ID, or a key from another authentication prior to the previous authentication.

18. The system of claim 15, wherein the NSI indicates the location of the authentication server.

19. A method comprising:
    receiving a network service identifier (NSI) and a service request, wherein the NSI comprises an authorization identifier (Auth ID);
    determining an authentication server associated with the Auth ID;
    verifying an authentication of a host using the Auth ID; and
    authorizing the host to receive a service associated with the service request.

20. The method of claim 19, wherein determining the authentication server comprises reading an authentication server domain from the NSI.

* * * * *